United States Patent [19]

Suda et al.

[11] Patent Number: 4,855,777
[45] Date of Patent: Aug. 8, 1989

[54] APPARATUS FOR DETECTING THE FOCUS ADJUSTED STATE OF AN OBJECTIVE LENS

[75] Inventors: Yasuo Suda; Masaki Higashihara; Terutake Kadohara, all of Yokohama, Japan

[73] Assignee: Canon Kabushiki Kaisha, Tokyo, Japan

[21] Appl. No.: 162,575

[22] Filed: Mar. 1, 1988

[30] Foreign Application Priority Data

Mar. 2, 1987 [JP] Japan ................................ 62-047245
Mar. 2, 1987 [JP] Japan ................................ 62-047246
Mar. 2, 1987 [JP] Japan ................................ 62-047247
Mar. 2, 1987 [JP] Japan ................................ 62-047248

[51] Int. Cl.$^4$ .............................................. G03B 3/00
[52] U.S. Cl. ................................... 354/402; 354/404
[58] Field of Search ...................... 354/400, 402, 404

[56] References Cited

U.S. PATENT DOCUMENTS

| | | | |
|---|---|---|---|
| 3,398,665 | 8/1968 | John, Jr. et al. | 354/404 |
| 3,450,018 | 6/1969 | John, Jr. | 354/404 |
| 3,856,407 | 12/1974 | Takeda et al. | 354/404 |
| 3,896,457 | 7/1975 | Yamanishi et al. | 354/404 |
| 4,047,022 | 9/1977 | Holle | 354/404 |
| 4,209,241 | 6/1980 | Nanba et al. | 354/404 |
| 4,543,476 | 9/1985 | Horikawa | 354/404 |

Primary Examiner—Russell E. Adams
Attorney, Agent, or Firm—Fitzpatrick, Cella, Harper & Scinto

[57] ABSTRACT

An focus detecting apparatus has a scanning plate disposed on or near the predetermined imaging plane of an objective lens and reciprocally movable to grating-scan the image of an object, a mask having an aperture adjacent to the scanning plate and movable to a desired position in a plane perpendicular to the optic axis of the objective lens to determine a range for detection, a plurality of light-receiving devices for receiving light fluxes passed through the scanning plate and the mask and outputting a signal regarding the focus adjusted state of the objective lens, and a field lens for relating the light fluxes entering the light-receiving devices to each other so as to pass through different areas of the exit pupil of the objective lens.

14 Claims, 6 Drawing Sheets

APPARATUS FOR DETECTING THE FOCUS ADJUSTED STATE OF AN OBJECTIVE LENS

BACKGROUND OF THE INVENTION

Field of the Invention

This invention relates to a focus detecting apparatus, and in particular to a focus detecting apparatus suitable for a photographic camera, a video camera or the like in which distance measurement can be accomplished at any position of an object.

Focus detecting apparatuses of various types have heretofore been proposed, and in principle, in any of them, distance measurement has been effected at the center of the picture plane of the finder field, i.e., on the optic axis of the objective lens, irrespective of the size of the distance measuring area. Therefore, there has been no problem when the main portion of an object to which the objective lens is to be focused is set at the center of the picture plane. However, when it is desired to set the main portion of the object at a position other than the center of the picture plane, it has been necessary to turn the camera so that the main portion of the object lies at the center of the picture plane and focus the objective lens, and then return the object to a desired position on the picture plane and re-set the picture plane. So, if a focus detecting apparatus which enables the distance measuring field to be moved is constructed, the above-noted problem will be solved, but in such case, the range in which distance measurement is possible, i.e., the length of the distance measuring field, must naturally be made great.

For example, when a light flux passed through the photo-taking lens is utilized and a light-receiving element for focus detection is fixed and focus detection is to be effected within this length of the distance measuring field, it is necessary to form the object image on the light-receiving element even if the imaged point of the object image moves. This has led to the problem that the light-receiving surface of the light-receiving element must have a wide area.

On the other hand, U.S. Pat. No. 3,553,455 shows an apparatus in which two images of an object (which have a parallax) are scanned by a slit. In addition, an apparatus in which two images formed by a light flux passed through an objective lens are scanned by a slit is known from Japanese Patent Publication No. 37957/1971. However, any of these apparatuses is such that the center of the distance measuring field coincides with the optic axis of the objective lens. That is, distance measurement is effected in the central region of the picture plane of the viewfinder.

Also, German Patent No. 2156617 discloses a technique in which the image is scanned, but distance measurement is effected at the center of the picture plane. As other focus detecting apparatuses, there are known U.S. Pat. Nos. 4,636,627, 4,634,255, 4,634,557, 4,670,645, 4,632,532 and 4,560,863.

SUMMARY OF THE INVENTION

It is an object of the present invention to enable the focus detection of an objective lens to be accomplished for an object at a desired position in the field of view.

It is another object of the present invention to enable a desired one of a plurality of detecting methods to be selected.

BRIEF DESCRIPTION OF THE DRAWINGS

FIGS. 1A and 1B and FIGS. 3 to 11 illustrate various elements in an embodiment of the present invention.

DESCRIPTION OF THE PREFFERRED EMBODIMENT

Figures 1A, 1B:
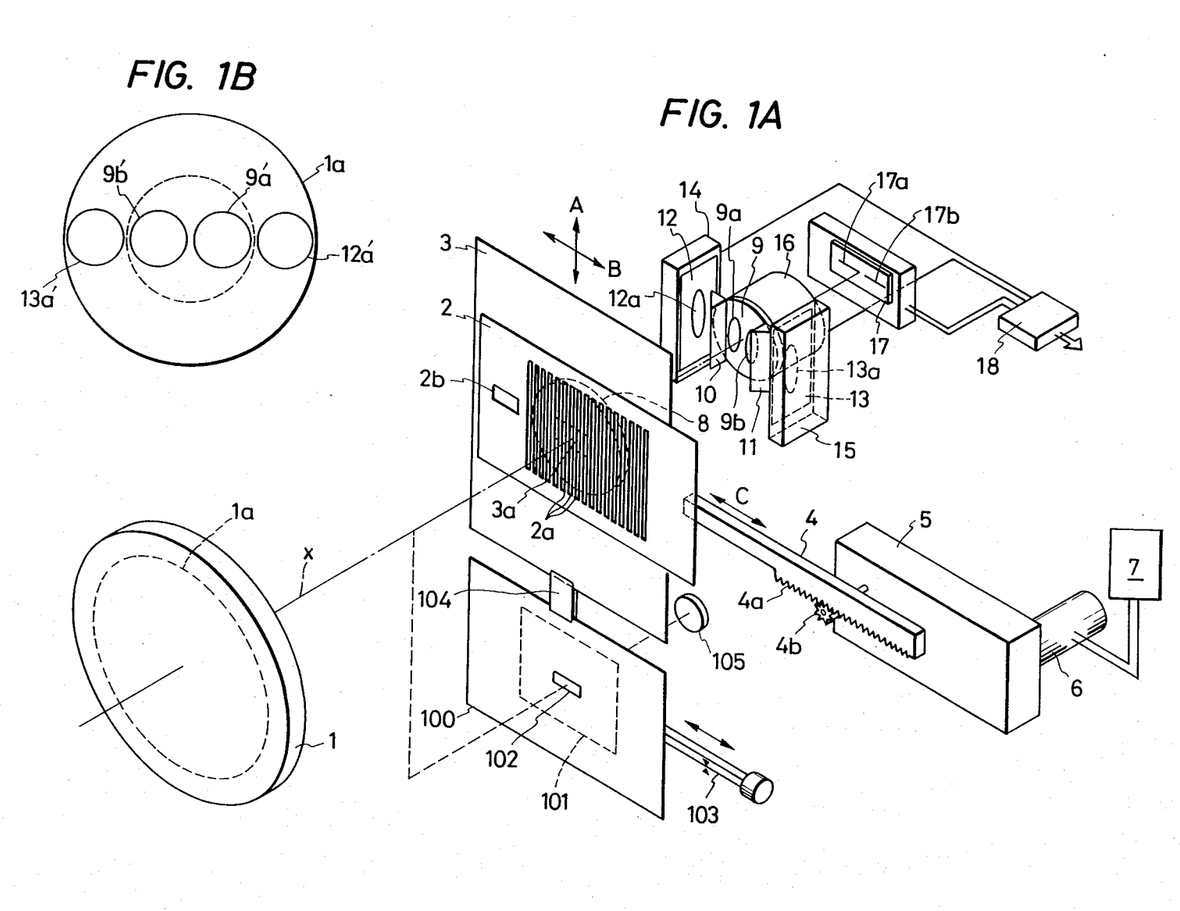
FIG. 1A is a perspective view of the optical system of a focus detecting apparatus.
FIG. 1B illustrates the divided condition of the exit pupil of an objective lens.

FIG. 1 is a perspective view of an embodiment of a focus detecting apparatus according to the present invention. In FIG. 1, there is shown a first focus detecting system according to the present invention and also an auxiliary second focus detecting system. In the figure, the reference numeral 1 designates an objective lens for forming an object image, and X denotes the optic axis thereof. The first and second focus detecting systems are provided rearwardly of the predetermined imaging plane of the objective lens 1. The predetermined imaging plane may be either a primary imaging plane or a re-imaging plane relaying it. The reference numeral 2 designates a slit member having, for example, a rectangular opening portion 2b and a grating portion having a plurality of slits 2a and movable in the scanning direction of arrow C. The slit member 2 is positioned substantially on the predetermined imaging plane of the objective lens 1. A rack 4a is secured to the slit member 2 and is driven by a motor 6 through a pinion gear 4b and a gear box 5. The reference numeral 7 denotes a control circuit for reciprocally moving the member 2 so that the slits 2a scan the image and setting the member 2 so that the rectangular opening 2b is positioned on the optic axis of the objective lens. The reference numeral 3 designates a field mask having, for example, a rectangular aperture 3a and movable in the directions of arrows A and B.

The rectangular aperture 3a of the field mask 3 is designed such that the length thereof in the direction of arrangement of the slits 2a of the slit member 2 is about an integer times the length of one pitch of the slits, said integer including 1.

The reference numeral 8 denotes a field lens disposed near the predetermined imaging plane, the reference numerals 12 and 13 designate the stops of the first focus detecting system, the reference numeral 9 denotes the stop of the second focus detecting system, and the reference numerals 14 and 15 designate light-receiving elements constituting first light-receiving means. The light-receiving elements 14 and 15 are arranged in the scanning direction with the optic axis X interposed therebetween. The reference numeral 17 denotes second light-receiving means, i.e., a light-receiving device, having two light-receiving element arrays 17a and 17b. Instead of two light-receiving element arrays, two ranges of a single element array may be electrically designated. The reference numeral 16 designates a secondary imaging lens having convex lenses behind stop openings 9a and 9b, respectively. The reference numerals 10 and 11 denote reflecting members for bending the optical path to make the apparatus compact.

The reference numeral 18 designates a calculating circuit using the output signals from the light-receiving elements 14 and 15 and the output signal of the light-receiving device 17 to calculate information indicative of the focus adjusted state of the objective lens.

The reference numeral 100 denotes a transparent finder field member, the reference numeral 101 designates the finder field, the reference numeral 102 denotes a frame for indicating the range of distance measurement in the finder field, and the reference numeral 103 designates a distance measuring position selecting lever which can be moved by the operator from the outside of a casing, not shown. The reference numeral 104 denotes a connecting member for connection with the field mask 3, and the reference numeral 105 designates an eyepiece. A viewfinder optical system for directing a light flux from the view field to the finder field is not shown.

The finder field member 100 may be moved through the connecting member 104 in response to the movement of the field mask 3 so as to display the range of distance measurement in the finder field.

Instead of the field mask 3 being moved, a plurality of ranges of distance measurement may be set on a liquid crystal display plate and one of these ranges may be selectively made transparent and the surroundings thereof may be made opaque, whereby the distance measuring field may be designated.

The first focus detecting system according to the present invention will now be described. The first focus detecting system is for effecting the distance measurement at any position in the finder field, and functions when the aperture 3a of the field mask 3 is set at any position in the effective aperture of the field lens, particularly, a position off the optic axis, and the aperture 3a overlaps the slits 2a of the slit member 2. The constituent members of the first focus detecting system disposed subsequently to the field mask 3 are the field lens 8 common to the second focus detecting system, the reflecting members 10 and 11 disposed outside the openings 9a and 9b of the second stop 9 and each having a trigonal inclined surface as a reflecting surface, the stop 12 for limiting the light flux reflected by the reflecting member 10, the stop 13 for limiting the light flux reflected by the reflecting member 11, and the light-receiving elements 14 and 15.

In the first focus detecting system, as will be described later, the slit member 2 is scanned in the direction of arrow C and at this time, correspondingly to said scanning, the phases of the variations in the output signals from the light-receiving elements 14 and 15 are detected to thereby accomplish focus detection.

FIG. 1B illustrates the divided condition of the exit pupil of the objective lens 1 in the present invention. In the figure, the reference character 1a designates the exit pupil of the objective lens 1, the reference characters 12a' and 13a' denote the inversely projected images of the stop openings 12a and 13a, respectively, of the stops 12 and 13 onto the surface of the exit pupil 1a by the field lens 8, and the reference characters 9a' and 9b' designate the inversely projected images of the stop openings 9a and 9b, respectively, of the stop 9 onto the surface of the exit pupil 1a by the field lens 8.

In the present embodiment, the exit pupil 1a of the objective lens 1 is divided into two pairs of areas as previously described by disposing the stop openings 12a and 13a of the stops 12 and 13 in more spaced apart relationship with the optic axis than the stop openings 9a and 9b of the stop 9.

The second focus detecting system will now be described. The second focus detecting system functions only when the rectangular opening 2b of the slit member 2 and the aperture 3a of the field mask 3 are both set on the optic axis of the objective lens 1. At this time, the light flux of the second focus detecting system is limited by the aperture 3a of the field mask 3 because the rectangular aperture 3a of the field mask 3 is made smaller than the opening 2b of the slit member 2.

The constituent members of the second focus detecting system disposed subsequently to the field mask 3 are the field lens 8, the stop 9 having two openings 9a and 9b, the secondary imaging lens 16 and the second light-receiving means 17 having two light-receiving element arrays 17a and 17b.

The second focus detecting system is particularly suitable for effecting focus detection highly accurately when the defocus amount of the objective lens 1 is great. The focus detection of the second focus detecting system is accomplished by the already known method proposed, for example, in Japanese Laid-Open patent application No. 101513/1985.

In the present embodiment, the first focus detecting system and the second focus detecting system share the field lens 8.

In many objective lenses used in photographic cameras, video cameras, etc., when the focal length is short and the lens is bright, the exit pupil position from the imaging plane is generally short, and when the focal length is long and the lens is dark, the exit pupil position from the imaging plane is long. Therefore, the first stop openings 12a and 13a in the first focus detecting system chiefly directed to bright objective lenses and having a variable distance measuring field are set so as to lie more outwardly relative to the optic axis than the second stop openings 9a and 9b in the second focus detecting system having a fixed distance measuring field, thereby achieving effective utilization of a light beam.

Also, the distance from the principal point of the image space of the field lens 8 to the first stop openings 12a, 13a is set so as to be longer than the distance from the pincipal point of the image space of the field lens 8 to the second stop openings 9a, 9b.

Thus, the inversely projected images of the first and second stop openings onto the objective lens side by the field lens 8 may be formed near the exit pupil position of the objective lens, and even if an objective lens of any focal length is mounted, effective utilization of the light flux can be ensured and improved accuracy of focus detection is achieved.

That is, the first stop openings 12a and 13a are such that the inversely projected images thereof are formed at positions near the predetermined imaging plane of the objective lens 1, and the second stop openings 9a and 9b are such that the inversely projected images thereof are formed at positions far from said predetermined imaging plane.

Figure 2:
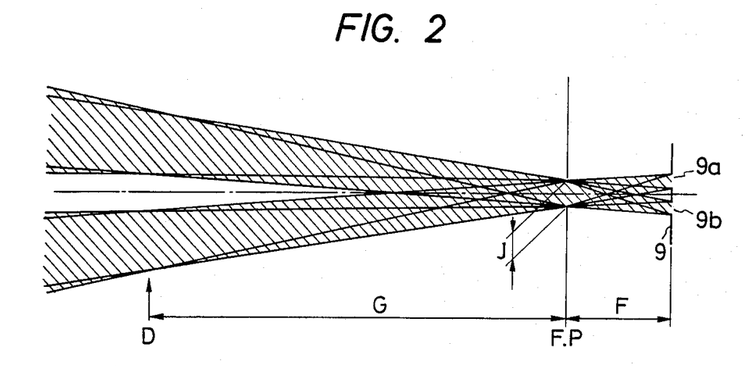
FIG. 2 illustrates the effective light fluxes when a focus detecting system according to the prior art is used with the focus detecting system of the present invention.
Figure 3:
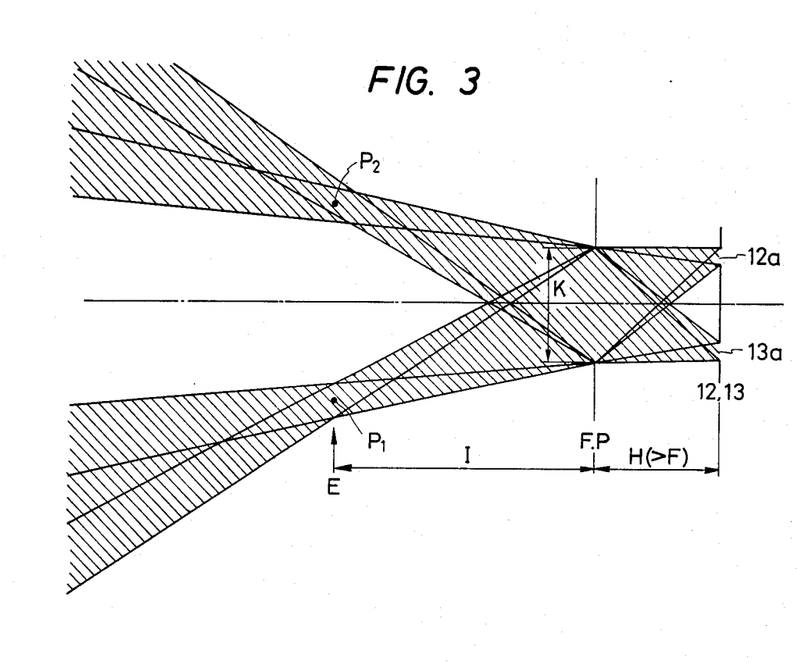
FIG. 3 illustrates the effective light fluxes of the focus detecting system.

A description will now be given of effective light fluxes entering the light-receiving means in the first and second focus detecting systems. FIGS. 2 to 5 are optical path diagrams showing the light fluxes from the exit pupil of the objective lens 1 which enter the stops 9, 12 and 13 disposed in the front faces of the light-receiving means in the respective focus detecting systems. FIG. 2 shows the case of the second focus detecting system, and FIG. 3 shows the case of the first focus detecting system.

In these figures, P1 and P2 designate the positions of the light rays passing through the centers of the openings 12a and 13a of the stops 12 and 13 in the exit pupil of the objective lens 1. F.P denotes the predetermined imaging plane of the objective lens 1, and the objective lens is positioned at the left side thereof and the first and second focus detecting systems are positioned at the right side thereof.

In the present embodiment, it is to be understood that the object image is formed near the predetermined imaging plane. The stops 9, 12 and 13 are designed so as to be conjugate with the vicinity of the exit pupil position of the objective lens 1 with respect to the field lens 8.

In FIG. 2, a surface D designates a surface conjugate with the stop 1, and in FIG. 3, a surface E denotes a surface conjugate with the stops 12 and 13.

In the present embodiment, the surface D is positioned more distantly from the predetermined imaging plane F.P than the surface E by setting the first stop openings 12a, 13a and the second stop openings 9a, 9b as previously described. J represents the length of the distance measuring field of the second focus detecting system, and K represents the length of the distance measuring field of the first focus detecting system. In FIGS. 2 and 3, the portions indicated by hatching represent the effective light fluxes in the respective focus detecting systems. Generally, in order that focus detection maybe accurately accomplished in the first and second focus detecting systems when the phase difference between two images is detected to thereby effect focus detection, it is necessary that the exit pupil of the objective lens 1 have a width including the range of the effective light fluxes represented by hatching in FIGS. 2 and 3. Therefore, the length K of the distance measuring field of the first focus detecting system in FIG. 3 means the total range over which the opening 3a of the field mask 3 is movable, and is relatively great as compared with that of the second focus detecting system. Thus, in the first focus detecting system, it becomes necessary to use an objective lens of small F-number which is relatively bright, that is, has a large exit pupil.

Figure 4:
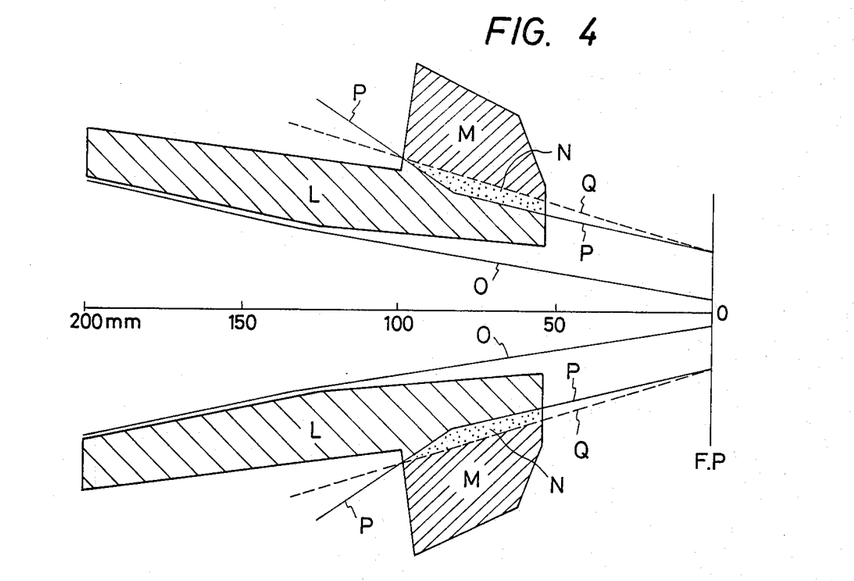
FIG. 4 illustrates the exit pupil position of a popular interchangeable objective lens for a single-lens reflex camera.

FIG. 4 shows, for information, the exit pupil position of an objective lens for a single-lens reflex camera such as a popular photographic camera and the size thereof.

In the figure, F.P indicates the predetermined imaging plane of the objective lens, the horizontal axis represents the optic axis, the scale indicates the distance from the predetermined imaging plane, and the vertical axis represents the size of the exit pupil. Ranges L, M and N represent areas in which the exit pupil of the objective lens in present. Depicting the effective light fluxes of the first and second focus detecting systems shown in FIGS. 3 and 2 while superposing them upon these areas, the effective light fluxes are present inside a straight line 0 in the second focus detecting system, and the effective light fluxes are present inside a straight line P in the first focus detecting system. That is, the second focus detecting system permits the use of an objective lens of the total range of the areas L, M and N, among objective lenses having an exit pupil within the range shown in FIG. 4, and the first focus detecting system permits the use of a photo-taking lens having an exit pupil in the areas M and N in FIG. 4.

In FIG. 4, broken line Q indicates the effective light flux in a case where the position when the stop in the first focus detecting system has been projected onto the exit pupil of the objective lens is indentical to the projection position when the stop in the second focus detecting system has been projected onto the exit pupil of the objective lens. In this case, if use is made of an objective lens having an exit pupil position in the area N, the light flux is eclipsed and thus, the accuracy of distance measurement is reduced.

Figure 5:
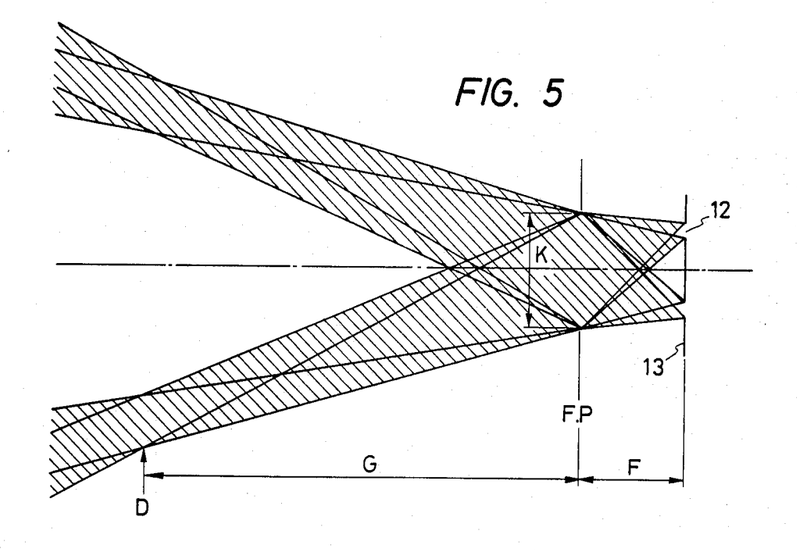
FIG. 5 illustrates the effective light fluxes when the position of the stop of the focus detecting system is changed.

FIG. 5 shows the optical path of the then effective light flux. In this figure, the distance from the surface D conjugate with the stops 12 and 13 near the exit pupil position of the objective lens to the predetermined imaging plane F.P is shown as a distance G identical to that in the second focus detecting system shown in FIG. 2.

Figure 6:
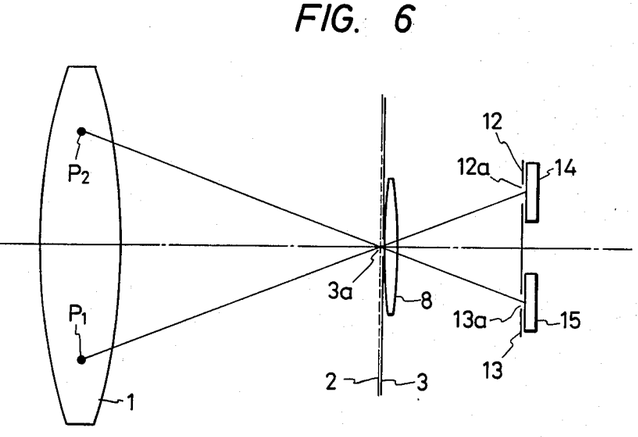
FIG. 6 illustrates the optical path when the distance measuring field of the focus detecting system is on the optic axis.
Figure 7:
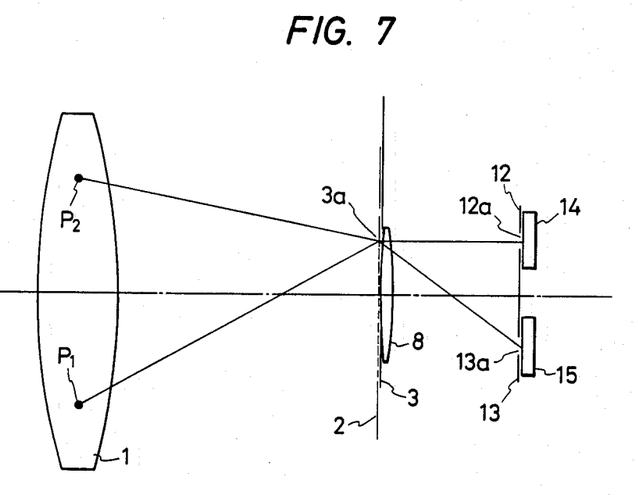
FIG. 7 illustrates the optical path when the distance measuring field of the focus detecting system is off the optic axis.

FIGS. 6 to 11 illustrate the principle of distance measurement of the first focus detecting system of the present invention. Of these figures, FIGS. 6 and 7 are developed cross-sectional views of the first focus detecting system when the objective lens 1 is in the in-focus state. FIG. 6 depicts the principal ray passing through the center of the opening 3 a in the field mask 3 in a case where the opening 3a in the field mask 3a is positioned on the optic axis. FIG. 7 depicts the principal ray in a case where the opening 3a in the field mask 3 is positioned off the optic axis. In these figures, P1 and P2 are similar to those in the optical path diagram shown in FIG. 3, that is, the projection positions of the light rays passing through the centers of the openings 12a and 13a of the stop on the exit pupil of the objective lens.

That is, P1 and P2 indicate the positions of the center of light intensity when the openings 12a and 13a of the stop have been projected onto the exit pupil. The surfaces of the stops 12 and 13 and the surface containing the points P1 and P2 are at positions conjugate with each other with respect to the field lens 8 and therefore, irrespective of the position of the opening 3a in the field mask 3, the light rays from the points P1 and P2 arrive at the light-receiving elements 14 and 15, respectively. Accordingly, even if the position of the opening 3a in the field mask 3 is set anywhere in the range of the length K of the distance measuring field shown in FIG. 3, that is, even if distance measurement is effected anywhere with the opening 3a moved, the light flux from the object image enters the light-receiving elements 14 and 15 and therefore, distance measurement can be accomplished with the locations of the light-receiving elements fixed.

Figure 8:
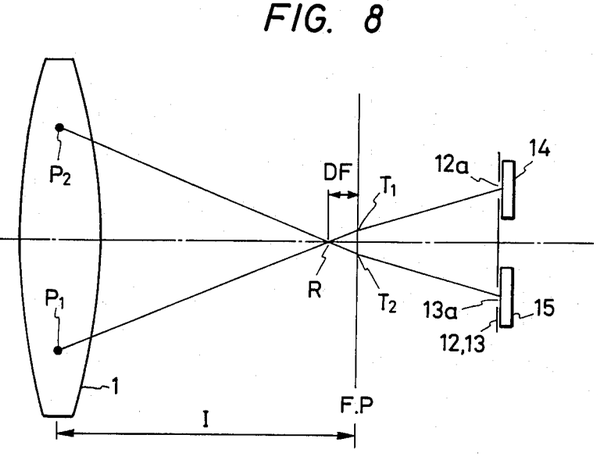
FIGS. 8 and 9 illustrate the image positions by defocus in the focus detecting system, FIG. 8 showing a case where the distance measuring field is on the optic axis, and FIG. 9 showing a case where the distance measuring field is off the optic axis.
Figure 9:
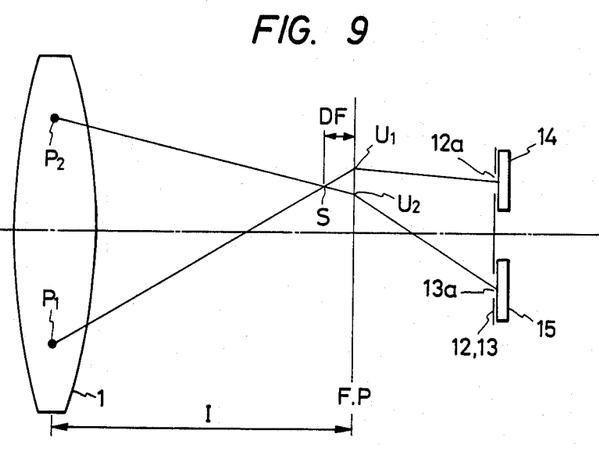

FIGS. 8 and 9 are developed cross-sectional views of the focus detecting system when the objective lens 1 is defocused by a predetermined amount DF. FIG. 8 is an illustration depicting the principal ray passing through the imaging point R on the optic axis, and FIG. 9 is an illustration depicting the principal ray passing through the imaging point S off the optic axis. The focus detecting system for detecting the phase difference between two images to thereby detect the in-focus state calculates the defocus amount from the spacing between the centers of light intensity of two object images on the predetermined imaging plane F.P. Therefore, it is necessary that irrespective of the position of the opening 3a in the field mask 3, the spacing between the centers of light intensity of two object images (for example, in FIG. 8, $\overline{T1, T2}$) be constant for a predetermined defocus amount. The relation between the then defocus amount DF and the spacing $\overline{T1, T2}$ will now be described with reference to FIGS. 8 and 9.

In FIG. 8,
$\angle P2, R, P1 = \angle T2, R, T1$ and $\angle R, P2, P1 = \angle R, T2, T1$.
Accordingly, $\Delta P2, p1, R \infty \Delta T2, T1, R$ and when the distance from the exit pupil of the objective lens 1 to the predetermined imaging plane F.P is I, the following equation is established:

$$\overline{T1, T2} = \frac{DF}{I - DF} \overline{P1, P2} \quad (1)$$

Likewise, in FIG. 9,
$\angle P2, S, P1 = \angle U2, S, U1$ and $\angle S, P2, P1 = \angle S, U2, U1$.
Accordingly, $\Delta P2, P1, S \infty \Delta U2, U1, S$ and the following equation is established:

$$\overline{U1, U2} = \frac{DF}{I - DF} \overline{P1, P2} \quad (2)$$

From equations (1) and (2), $$\overline{T1, T2} = \overline{U1, U2}.$$

That is, when the defocus amount DF is constant, the spacing between the centers of light intensity of two images does not vary for any of the imaging points R and S. Accordingly, even if the opening 3a in the field mask 3 is moved to any position in the distance measuring field, the defocus amount can be found with good accuracy. That is, in the present embodiment, the opening 3a in the field mask 3 may be located anywhere, and it is not necessary to use a different focus detecting system depending on the difference in the distance measuring field, and stable focus detection can be accomplished by only the first focus detecting system.

Figure 10A:
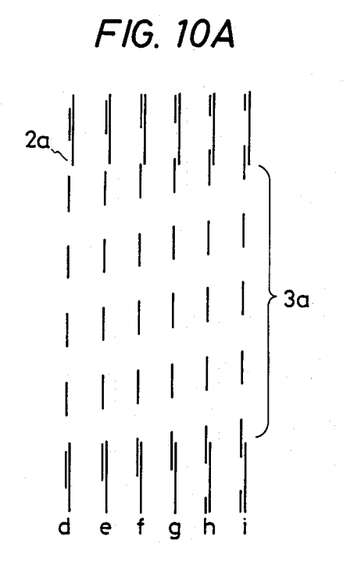
FIGS. 10A and 10B illustrate the relative positional relation between two object images and slits.
Figure 10B:
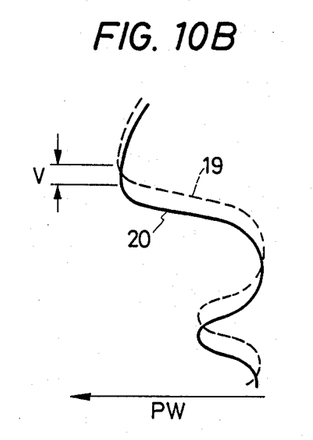
Figure 11:
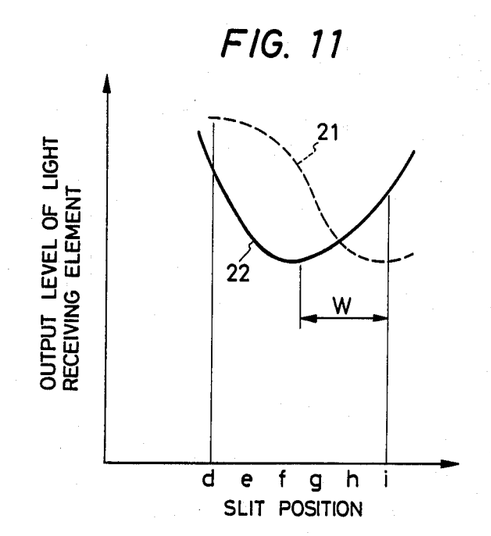
FIG. 11 illustrates the relation between the slits and the output values from two light-receiving elements.

FIGS. 10A, 10B and 11 illustrate output signals obtained from the light-receiving elements 14 and 15 which have received the light flux passing through the slits 2a of the slit member 2 and the opening 3a in the field mask 3 when the slit member 2 is scanned. The basic principle of the detecting method shown in these figures in the heretofore practised method of detecting the amount of deviation between two images.

In the present embodiment, the length of the opening 3a the field mask 3 in the direction of arrangement of the slits 2a is constructed in such rectangular shape which is, for example, about four times the length of a slit 2a (the sum of the area transmitting the light beam therethrough and the area not transmitting the light beam therethrough), whereby the output signals from the light-receiving elements 14 and 15 when the slit member 2 is moved are obtained in a stable state.

In FIG. 10A, d, e, f, g, h and i indicate the moved positions of the slits 2a, and in FIG. 10B, there are schematically shown the distributions of quantity of light of two object images 19 and 20 in the opening 3a. In FIG. 10B, the reference numerals 19 and 20 indicate the illumination distributions of the object images on the predetermined imaging plane F.P of the objective lens formed by the light fluxes passing through the openings 12a and 13a, respectively, of the stops 12 and 13.

In FIG. 10B, the horizontal axis represents illumination PW and the vertical axis represents the position on the predetermined imaging plane. The object images 19 and 20 having such illumination distributions are sampled by the slits 2a of the slit member 2 disposed substantially on the predetermined imaging plane and the opening 3a in the field mask 3, and enter the light-receiving elements 14 and 15, respectively. As shown in FIG. 1, the slit member 2 is moved in the direction of arrow C by the motor 7, and the then positional relations thereof with the object images are as indicated by d to i in FIGS. 10A and 10B. The width of the opening 3a in the field mask 3 is designed so as to be an integer times (in FIG. 10A, four times) the slit pitch and therefore, in any of the positions d to i, the area of the light-transmitting area formed by the opening 3a in the field mask 3 and the slits 2a is kept constant. Accordingly, the outputs from the respective light-receiving elements 14 and 15 conforming to the positions d to i of the slits vary with a phase difference corresponding to the amount of deviation between the two object images. In the case of the object images having the illumination distributions shown in FIG. 10B, the outputs from the light-receiving elements 14 and 15 conforming to the positions d to i of the slits are as indicated by curves 21 and 22 in FIG. 11. In FIG. 11, the horizontal axis represents the position of the slits 2a and the vertical axis represents the output values from the light-receiving elements 14 and 15. The curve 21 indicated by broken line corresponds to the illumination distribution 19 of the object image in FIG. 10B, and the curve 22 indicated by solid line corresponds to the illumination distribution 20 of the object image in FIG. 10B. Also, the amount of deviation V between the object images in FIG. 10B is equal to the phase difference W between the output distributions 21 and 22 from the light-receiving elements 14 and 15 in FIG. 11.

The calculation of the defocus amount of the objective lens 1 can be accomplished in the following manner. When the defocus amount is $DF$, $\overline{T1, T2} = V$ in FIG. 8 and there is the relation that $V: \overline{P1, P2} = DF:(I-DF)$. Accordingly, the following equation is derived:

$$DF = \frac{VI}{\overline{P1, P2} + V} \quad (3)$$

Accordingly, the defocus amount DF can be found from equation (3).

As a method of detecting the amount of image deviation in the present embodiment, the outputs from the light-receiving elements 14 and 15 corresponding to the position of the slit member 2 may be dealt with instead of the outputs from the light-receiving elements 17a and 17b of the second focus detecting system, and according to this, the first focus detecting system and the second focus detecting system can utilize a single method of detecting and calculating the amount of image deviation.

As described above, in the present embodiment, the focus detection at any position in the finder field is possible by the first focus detecting system. Alternatively, by using the first and second focus detecting systems together, the design may be made such that for example, in the second focus detecting system, detection of great defocus of the order of 30 mm is effected chiefly on the optic axis and in the first focus detecting system, movement of the distance measuring field is effected. From these features of the respective focus detecting systems, for example, the following application is conceivable. Where this focus detecting apparatus is applied to a single-lens reflex camera or the like, the second focus detecting system is used to focus the photo-taking lens to a main object at the center of the picture plane, and then the main object is framed to any position on the picture plane, whereafter the main object is pursued by the first focus detecting system to thereby accomplish photographing.

According to the present invention, there can be achieved a focus detecting apparatus which can move the distance measuring field to any position to accomplish focus detection by a very simple construction in which the slit member having a plurality of slits is scanned and the opening in the field mask is made movable to any position in the finder field and the light beam passed through the slits and the opening is received by two light-receiving elements through a stop.

Also, according to the present invention, there can be achieved a focus detecting apparatus which uses the two first and second focus detecting systems set as previously described, whereby for example, in the first focus detecting system, focus detection of small defocus is possible in any distance measuring field and in the second focus detecting system, focus detection of great defocus is possible in a predetermined distance measuring field on the optic axis.

Particularly, there can be achieved a focus detecting apparatus in which the exit pupil of the objective lens is divided into four areas forming two pairs and used as previously described, whereby in the second focus detecting system, focus detection of great defocus in a predetermined field in a dark objective lens of great F-number to a bright objective lens of small F-number is accomplished and in the first focus detecting system, focus detection of small defocus of a variable distance measuring field chiefly in a bright objective lens of small F-number is accomplished.

Further, there can be achieved a focus detecting apparatus of simple construction in which some optical members of the first and second focus detecting systems are made common, whereby bulkiness of the entire apparatus is effectively prevented in spite of the two focus detecting systems being used.

I claim:

1. An apparatus for detecting the focus adjusted state of an objective lens, comprising:
    scanning means having optical slits and disposed on or near a predetermined imaging plane of said objective lens for scanning the image of an object in a predetermined scanning direction;
    aperture setting means disposed on or near said predetermined imaging plane for (1) providing an aperture which determines a range for detection, (2) moving the aperture to a desired position in the field of view, and (3) masking a light beam from entering portions other than the aperture;
    a plurality of light-receiving device for receiving light fluxes passed through said optical slits and said aperture, and for outputting a signal regarding the focus adjusted state of said objective lens; and
    means for relating the light fluxes entering said light-receiving devices with each other so that they pass through different areas of the exit pupil of said objective lens.

2. An apparatus according to claim 1, wherein the length of said aperture is substantially an integer times the pitch of the optical slits arranged in the scanning direction.

3. An apparatus according to claim 1, wherein said means for relating has a field lens.

4. An apparatus according to claim 1, wherein said scanning means has an opaque plate having slits arranged in the scanning direction, and drive means for reciprocally moving said opaque plate.

5. An apparatus according to claim 1, wherein said aperture setting means has a mask provided with said aperture, and displacing means for displacing said mask in a direction perpendicular to the optic axis of said objective lens.

6. An apparatus according to claim 1, wherein said light-receiving devices are disposed with the optic axis of said objective lens interposed therebetween.

7. An apparatus according to claim 6, wherein each of said light-receiving devices is a single light-receiving element.

8. An apparatus according to claim 1, further comprising with a viewfinder, display means for displaying said range for detection in the field of said viewfinder, and changing means for changing the position of the display by said display means in conformity with the movement of the position of said aperture.

9. An apparatus for detecting the focus adjusted state of an objective lens, comprising:
    a first focus detecting system, including first and second photodetector means, for receiving light fluxes passed through first and second areas of the exit pupil of said objective lens onto said first and second photodetector means, and for forming a signal regarding the focus adjusted state of said objective lens, said first focus detecting system being capable of changing a detection range;
    a second focus detecting system, including third and fourth photodetector means, for receiving light fluxes passed through third and fourth areas of the exit pupil of said objective lens onto said third and fourth photodetector means, and for forming a signal regarding the focus adjusted state of said objective lens, said second focus detecting system having a fixed detection range;
    optical means for relating the light flux entering said first photodetector means and passed through said first area, the light flux entering said second photodetector means and passed through said second area, the light flux entering said third photodetector means and passed through said third area, and the light flux entering said fourth photodetector means and passed through said fourth area; and
    means for causing said first focus detecting system and said second focus detecting system to function alternatively.

10. An apparatus according to claim 9, wherein said optical means comprises a field lens disposed on or near the predetermined imaging plane of said objective lens.

11. An apparatus according to claim 9, wherein said means for causing said first and second focus detecting systems to function alternatively has a mask provided with a grating structure for scanning the light fluxes entering said first and second photodetector means and an aperture for regulating the light fluxes entering said third and fourth photodetector means.

12. An apparatus according to claim 9, wherein said first and second areas are set more inside than said third and fourth areas.

13. An apparatus according to claim 9, wherein said first and second photodetector means comprise photosensors, and said third and fourth photodetector means comprise arrays of photosensors.

14. An apparatus according to claim 10, wherein said first focus detecting system has first and second stops for regulating the light fluxes entering said first and second photodetector means, said second focus detecting system has third and fourth stops for regulating the light fluxes entering said third and fourth photodetector means, and the distance from the image field side principal point of said field lens to said first and second stops is longer than the distance from the image field side principal point of said field lens to said third and fourth stops.

* * * * *

UNITED STATES PATENT AND TRADEMARK OFFICE
CERTIFICATE OF CORRECTION

PATENT NO. : 4,855,777

DATED : August 8, 1989

INVENTOR(S) : Suda, et al.

It is certified that error appears in the above-identified patent and that said Letters Patent is hereby corrected as shown below:

[57]  ABSTRACT:

Line 1, change "An" to --A--.

COLUMN 3:

Line 53, change "measument" to --measurement--.

COLUMN 4:

Line 65, change "pincipal" to --principal--.

COLUMN 5:

Line 37, change "stop 1" to --stop 9--.

Line 50, change "maybe" to --may be--.

Line 66, change "camera" to --camera,--.

COLUMN 6:

Line 41, change "opening 3 a" to --opening 3a--.

Line 42, change "field mask 3a" to --field mask 3--.

UNITED STATES PATENT AND TRADEMARK OFFICE
CERTIFICATE OF CORRECTION

PATENT NO. : 4,855,777

DATED : August 8, 1989

INVENTOR(S) : Suda, et al.

It is certified that error appears in the above-identified patent and that said Letters Patent is hereby corrected as shown below:

COLUMN 7:

Line 22, change " P2, p1, R∞  T2, T1, R" to
-- P2, P1, R∞  T2, T1, R--.

Line 61, change "in" to --is--.

Line 64, change "3a the" to --3a in the--.

Line 65, change "rectangular" to --a rectangular--.

COLUMN 8:

Line 58, change "DF = $\frac{VI}{P1, P2 + V}$   (3)" to --DF = $\frac{VI}{\overline{P1, P2} + V}$   (3)--

COLUMN 9:

Line 59, change "I claim" to --We claim--.

UNITED STATES PATENT AND TRADEMARK OFFICE
CERTIFICATE OF CORRECTION

PATENT NO. : 4,855,777

DATED : August 8, 1989

INVENTOR(S) : Suda, et al.

It is certified that error appears in the above-identified patent and that said Letters Patent is hereby corrected as shown below:

COLUMN 10:

Line 4, change "light-receiving device" to --light-receiving devices--.

Line 34, delete "with".

COLUMN 11:

Line 12, change "more inside than" to --inside--.

Signed and Sealed this

Eleventh Day of September, 1990

Attest:

HARRY F. MANBECK, JR.

*Attesting Officer*      *Commissioner of Patents and Trademarks*